US008452831B2

(12) United States Patent  (10) Patent No.: US 8,452,831 B2
Olson et al.  (45) Date of Patent: May 28, 2013

(54) APPARATUS AND METHOD FOR IMPLEMENTING HARDWARE SUPPORT FOR DENORMALIZED OPERANDS FOR FLOATING-POINT DIVIDE OPERATIONS

(75) Inventors: Christopher H. Olson, Austin, TX (US); Jeffrey S. Brooks, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1093 days.

(21) Appl. No.: 12/415,370

(22) Filed: Mar. 31, 2009

(65) Prior Publication Data

US 2010/0250639 A1  Sep. 30, 2010

(51) Int. Cl.
*G06F 7/44* (2006.01)
*G06F 7/487* (2006.01)

(52) U.S. Cl.
USPC ............................ 708/656; 708/504; 708/655

(58) Field of Classification Search
USPC .................................. 708/504, 655, 654, 656
See application file for complete search history.

(56) References Cited

U.S. PATENT DOCUMENTS

| | | |
|---|---|---|
| 4,761,757 A | 8/1988 | Sakai et al. |
| 4,939,686 A | 7/1990 | Fandrianto |
| 4,992,968 A | 2/1991 | Adiletta |
| 4,999,801 A | 3/1991 | Katsuno |
| 5,023,827 A | 6/1991 | Kehl et al. |
| 5,105,378 A | 4/1992 | Mori |
| 5,132,925 A | 7/1992 | Kehl et al. |
| 5,206,828 A | 4/1993 | Shah et al. |
| 5,258,944 A | 11/1993 | Smith |
| 5,272,660 A | 12/1993 | Rossbach |
| 5,301,139 A | 4/1994 | Zinger |
| 5,339,267 A | 8/1994 | Ito |
| 5,357,455 A | 10/1994 | Sharangpani et al. |
| 5,404,324 A | 4/1995 | Colon-Bonet |
| 5,515,308 A | 5/1996 | Karp et al. |
| 5,619,439 A | 4/1997 | Yu et al. |
| 5,696,712 A | 12/1997 | Prabhu et al. |
| 5,757,688 A | 5/1998 | Chen et al. |

(Continued)

OTHER PUBLICATIONS

J. Arjun Prabhu and Gregory B. Zyner, "167 MHz Radix-8 Divide and Square Root Using Overlapped Radix-2 Stages," Proceedings of the 12th Symposium on Computer Arithmetic, 1995.

(Continued)

*Primary Examiner* — Tammara Peyton
(74) *Attorney, Agent, or Firm* — Meyertons, Hood, Kivlin, Kowert & Goetzel, P.C.; Stephen J. Curran

(57) ABSTRACT

A floating-point circuit may include a floating-point operand normalization circuit configured to receive input floating-point operands of a given floating-point divide operation, the operands comprising a dividend and a divisor, as well as a divide engine coupled to the normalization circuit. In response to determining that one or more of the input floating-point operands is a denormal number, the operand normalization circuit may be further configured to normalize the one or more of the input floating-point operands and output a normalized dividend and normalized divisor to the divide engine, and dependent upon respective numbers of leading zeros of the dividend and divisor prior to normalization, generate a value indicative of a maximum possible number of digits of a quotient (NDQ). The divide engine may be configured to iteratively generate NDQ digits of a floating-point quotient from the normalized dividend and the normalized divisor provided by the floating-point operand normalization circuit.

20 Claims, 8 Drawing Sheets

U.S. PATENT DOCUMENTS

| | | | |
|---|---|---|---|
| 5,787,030 | A | 7/1998 | Prabhu et al. |
| 5,798,955 | A | 8/1998 | Matsubara |
| 5,825,681 | A * | 10/1998 | Daniel et al. .................. 708/654 |
| 5,870,323 | A | 2/1999 | Prabhu et al. |
| 5,910,910 | A | 6/1999 | Steele, Jr. |
| 5,928,318 | A | 7/1999 | Araki |
| 5,954,789 | A | 9/1999 | Yu et al. |
| 6,108,682 | A | 8/2000 | Matheny |
| 6,351,760 | B1 | 2/2002 | Shankar et al. |
| 6,549,926 | B1 | 4/2003 | Kalambur et al. |
| 6,564,239 | B2 | 5/2003 | Matson et al. |
| 6,594,681 | B1 | 7/2003 | Prabhu |
| 6,625,633 | B1 | 9/2003 | Hirairi |
| 6,751,645 | B1 | 6/2004 | Gorshtein et al. |
| 7,539,720 | B2 | 5/2009 | Olson |
| 2004/0249877 | A1 | 12/2004 | Gerwig |

OTHER PUBLICATIONS

Neil Burgess and Chris Hinds, "Design issues in radix-4 SRT square root & divide unit," Thirty-Fifth Asilomar Conference on Signals, Systems and Computers, 2001.

Chin-Chieh Chao, Statutory Invention Registration, Reg. No. US H1993 H, published Sep. 2, 2001.

* cited by examiner

APPARATUS AND METHOD FOR IMPLEMENTING HARDWARE SUPPORT FOR DENORMALIZED OPERANDS FOR FLOATING-POINT DIVIDE OPERATIONS

BACKGROUND

1. Field of the Invention

This invention relates to processors and, more particularly, to execution of floating-point arithmetic instructions.

2. Description of the Related Art

Many processor implementations include support for floating-point arithmetic, and in particular for floating-point divide operations. However, in the majority of cases, hardware support for floating-point division is restricted to instances in which the operands are normalized numbers. If either the dividend or divisor is a denormal number, a software trap must be taken to perform the division, which results in a substantial number of extra execution cycles.

SUMMARY

Various embodiments of a floating-point circuit and method for providing hardware support for floating-point division using denormal operands are disclosed. In one embodiment, a floating-point circuit may include a floating-point operand normalization circuit configured to receive input floating-point operands of a given floating-point divide operation, the operands comprising a dividend and a divisor, as well as a divide engine coupled to the floating-point operand normalization circuit. In response to determining that one or more of the input floating-point operands is a denormal number, the floating-point operand normalization circuit may be further configured to normalize the one or more of the input floating-point operands and output a normalized dividend and normalized divisor to the divide engine, and dependent upon respective numbers of leading zeros of the dividend and divisor prior to normalization, generate a value indicative of a maximum possible number of digits of a quotient (NDQ). The divide engine may be configured to iteratively generate NDQ digits of a floating-point quotient from the normalized dividend and the normalized divisor provided by the floating-point operand normalization circuit.

Figure 1:
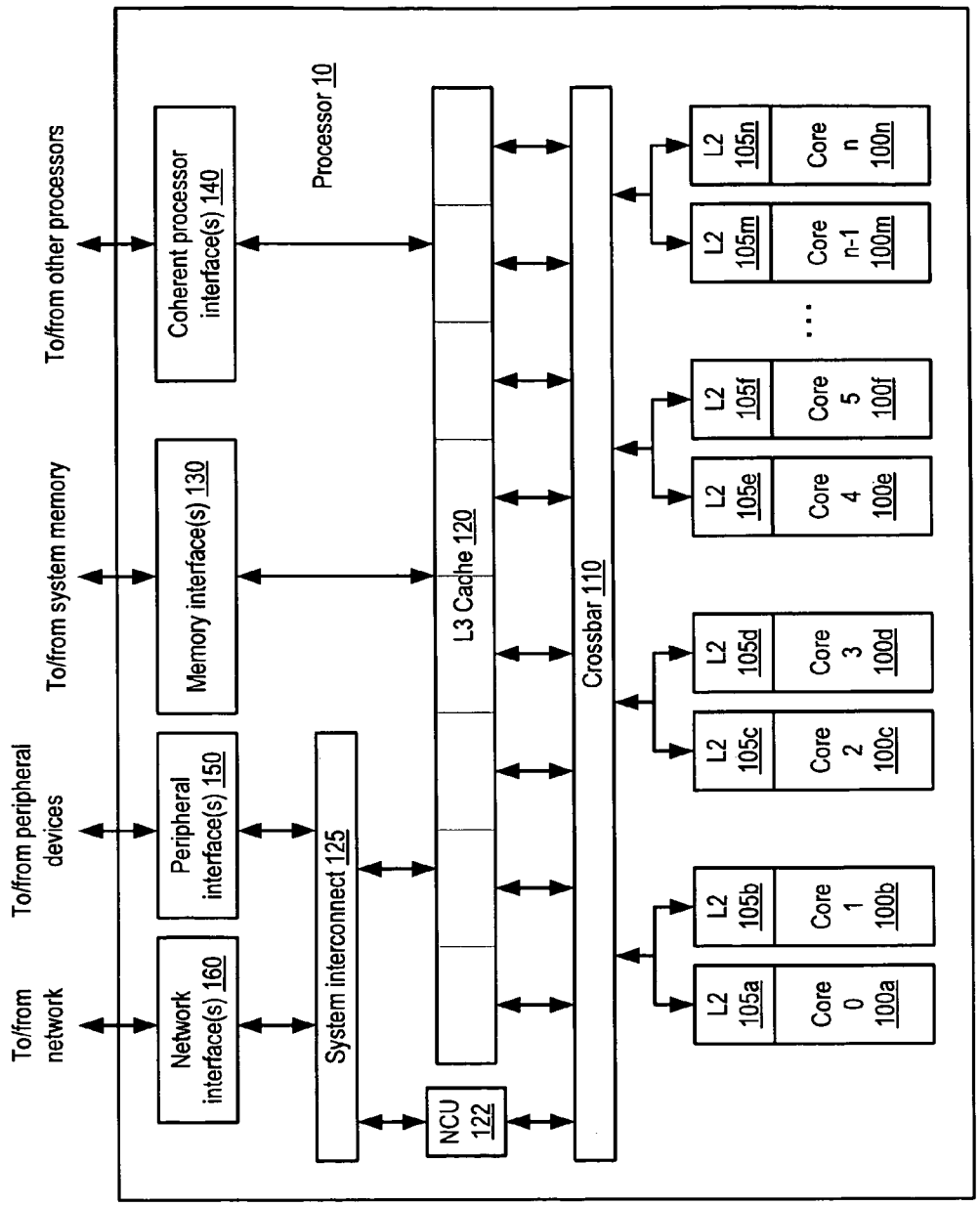
FIG. 1 is a block diagram illustrating one embodiment of a multithreaded processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, hardware support for division of floating-point denormal operands is explored. First, an overview is provided of one type of multithreaded processor in which floating-point division may be implemented. Next, a general overview of floating-point division is discussed. Particular embodiments of circuitry that are configured to support processing of denormal operands during division are then described. Finally, an exemplary system embodiment including a processor that may implement such denormal operand processing is discussed.

Overview of Multithreaded Processor Architecture

A block diagram illustrating one embodiment of a multithreaded processor 10 is shown in FIG. 1. In the illustrated embodiment, processor 10 includes a number of processor cores 100*a-n*, which are also designated "core 0" though "core n." Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
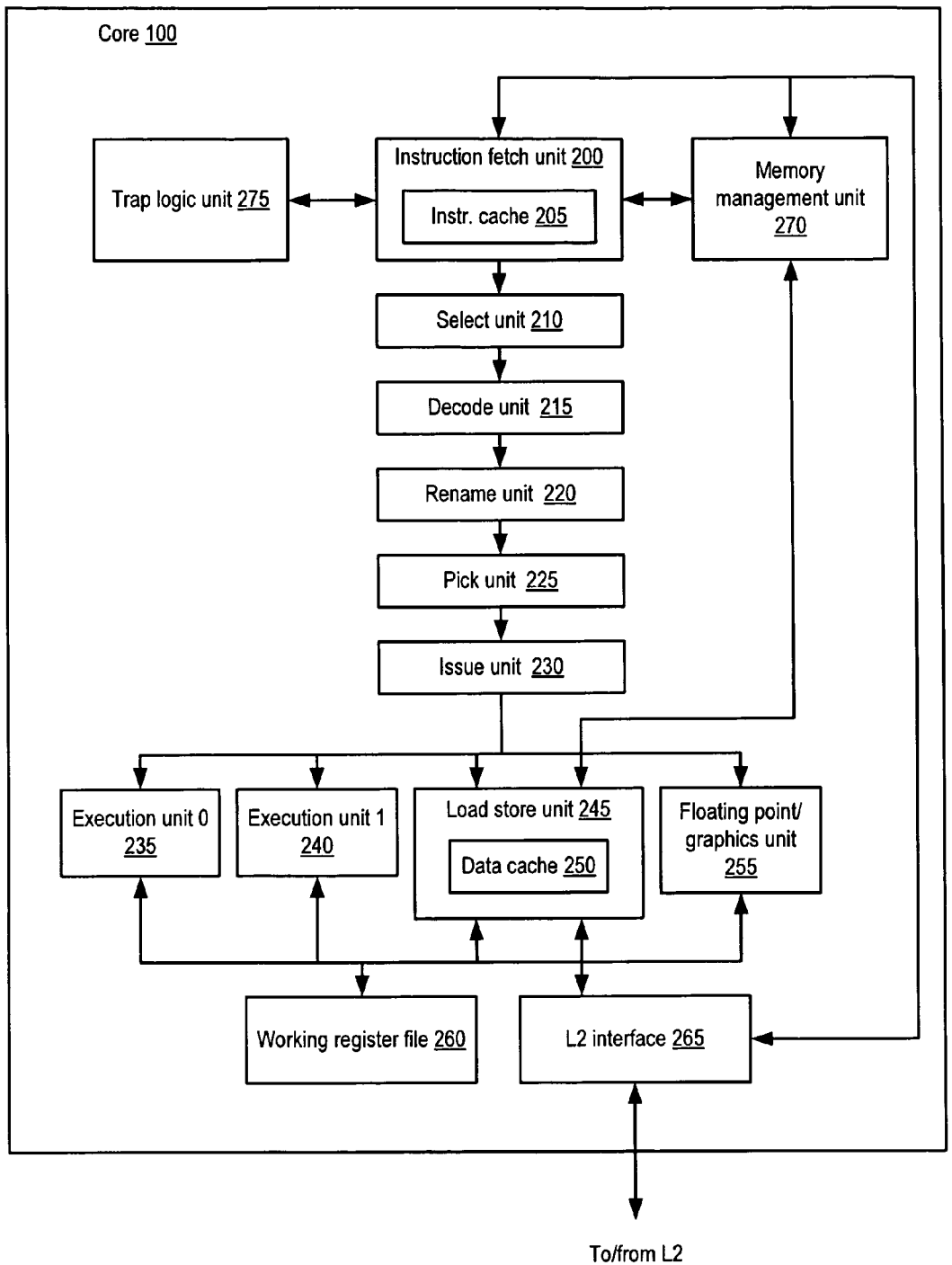
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may be not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Overview of Floating Point Division

Figure 3:
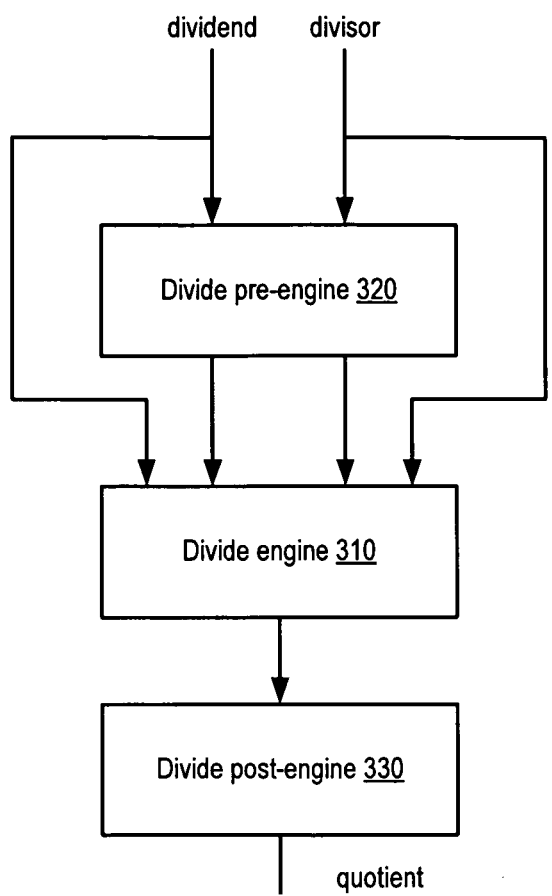
FIG. 3 is a block diagram illustrating one embodiment of circuitry configured to perform floating-point division.

As noted above, in some embodiments, FGU 255 may be configured to implement hardware support for various types of arithmetic operations. In one particular embodiment, FGU 255 may include a hardware divider circuit that may be configured to perform division of floating-point operands. One such embodiment is illustrated in FIG. 3, in which FGU 255 includes divide engine 310, divide pre-engine 320, and divide post-engine 330.

Generally speaking, divide engine 310 may be configured to iteratively produce a quotient from a dividend (i.e., a numerator) and a divisor (i.e., a denominator). To do so, divide engine 310 may include circuitry configured to implement any of a number of subtractive division algorithms or other suitable iterative approaches to computing a quotient. Subtractive division algorithms may generally be characterized by the following equation:

$$P_{j+1} = rP_j - q_{j+1}D$$

where $P_j$ denotes the partial remainder (which is initially set to the dividend), r denotes the radix of the algorithm, D denotes the divisor, and $q_{j+1}$ denotes the quotient digit corresponding to the partial remainder generated by a given iteration of the algorithm. As can be seen from the form of the subtractive division equation, successive partial remainders may be generated by multiplying a previous partial remainder by the radix (which may be implemented by a logical left shift operation when the partial remainder is a binary number and the radix is a power of 2) and then subtracting the product of the selected quotient digit and the divisor.

Numerous variations of subtractive division algorithms exist, and any suitable version may be implemented by divide engine 310 in various embodiments. For example, divide engine 310 may be configured to implement a restoring division algorithm in which the quotient digits q are selected from the set $\{0, 1\}$, or a non-restoring division algorithm in which the quotient digits q are selected from the set $\{-1, 1\}$ (i.e., employing a signed-digit representation). In another embodiment, divide engine 310 may be configured to implement an SRT non-restoring division algorithm in which quotient digits q are selected from the set $\{-1, 0, 1\}$.

As noted from the form of the subtractive division equation, the quotient digit is an input that determines the next partial remainder. Typically, the quotient digit may be selected at each iteration according to its effect or estimated effect on the resulting partial remainder: generally, when the algorithm terminates, the partial remainder should be as close to zero as possible while remaining positive. Thus, for example, in an iteration of radix-2 restoring division, the quotient digit may be initially estimated to be 1, and the dividend D may be subtracted from the shifted partial remainder $2P_j$. If the new partial remainder resulting the subtraction is positive, the quotient digit estimation may be considered to be correct, and the iteration may terminate. If the new partial remainder resulting from the subtraction is negative, the initial quotient digit estimation of 1 in fact incorrectly overestimated the quotient digit for the current iteration. In this instance, the dividend D may be added back to the new partial remainder in order to negate the effect of the original estimation by restoring the original value of the shifted partial remainder $2P_j$.

As just noted, restoring division involves the possibility of having to perform two addition-type operations per iteration: the initial subtraction of the divisor, and conditionally, the restoring addition of the divisor. Non-restoring division algorithms may generally avoid the restoring addition that results from overestimation of the quotient digit. Instead, non-restoring division may correct for overestimation of a prior quotient digit by selecting a negative quotient digit. However, for correct operation, it may still be necessary to limit the degree to which overestimation of a quotient digit may occur, which may be accomplished by ensuring that the partial remainders remain bounded within a defined range of values. In some embodiments, keeping the partial remainder bounded may be implemented by ensuring that the initial dividend and divisor are normalized (i.e., have a 1 in the most significant bit position), and by using an appropriate quotient digit selection function to estimate the quotient digits.

One embodiment of a quotient digit selection function for SRT non-restoring division is illustrated in the table below. In the following table, the most significant four bits of the partial remainder value $2P_j$ are given in 2's complement form as the input (also shown as an equivalent decimal fraction), and the corresponding value of the quotient digit $q_{j+1}$ is given as the output. In this implementation, it is assumed that the partial remainder value is constrained as follows:

$$-\frac{5}{2} \le 2P_j \le \frac{3}{2}$$

Under such constraints, some possible values of $2P_j$ should not occur and are not shown; in some embodiments, these values may be used as don't-cares to simplify the logic that implements the quotient digit selection function.

| $2P_j$ | $q_{j+1}$ |
|---|---|
| 101.1 (−5/2) | −1 |
| 110.0 (−2) | −1 |
| 110.1 (−3/2) | −1 |
| 111.0 (−1) | −1 |
| 111.1 (−1/2) | 0 |
| 000.0 (0) | +1 |
| 000.1 (1/2) | +1 |
| 001.0 (1) | +1 |
| 001.1 (3/2) | +1 |

It is noted that this particular quotient digit selection function is but one possibility. Other embodiments are possible and contemplated, and any suitable function may be implemented by divide engine 310.

Figure 4A:
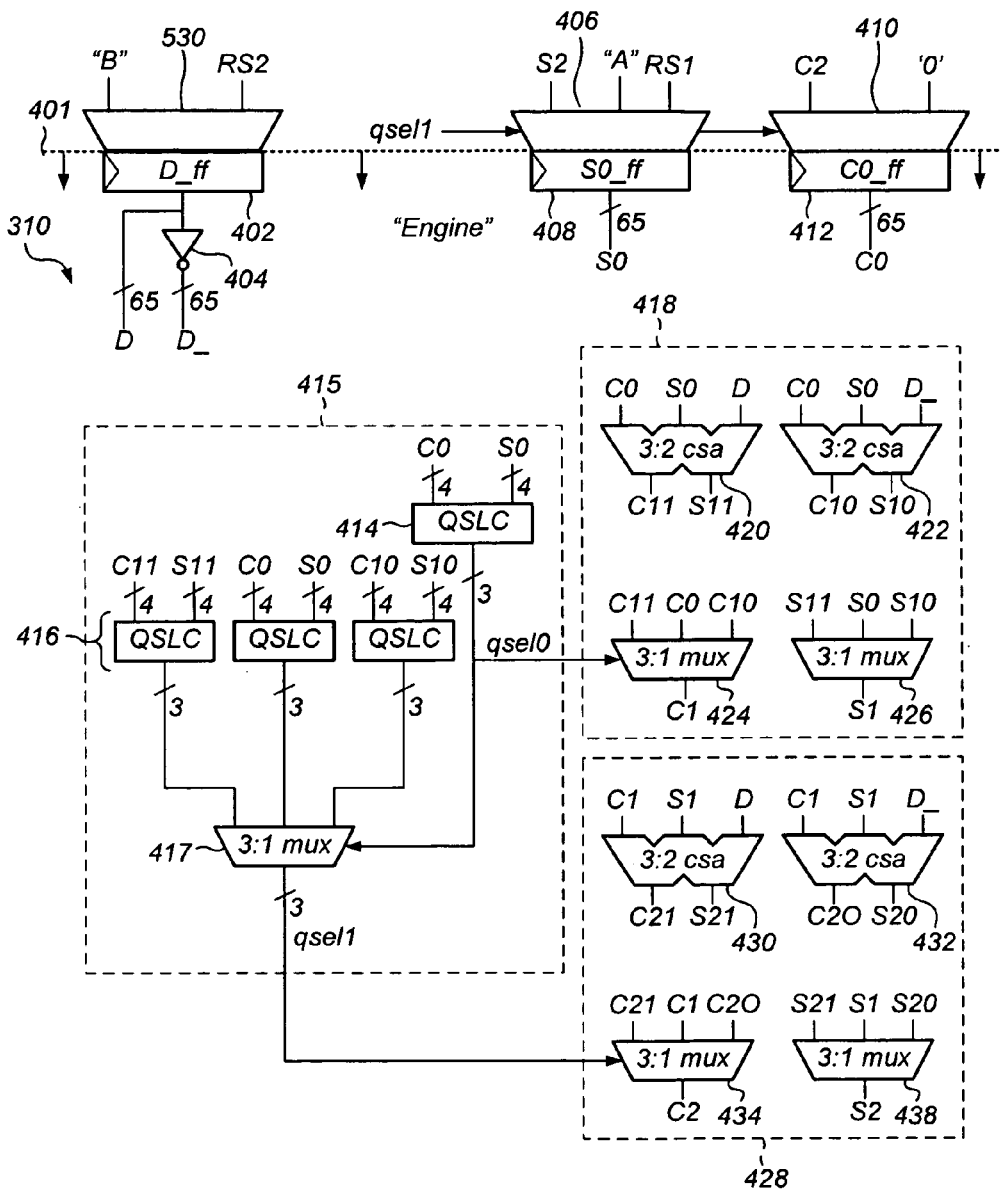
FIG. 4A is a block diagram illustrating one embodiment of circuitry configured to implement a floating point divide engine.

FIG. 4A shows a block-level representation of an embodiment of an exemplary radix-4 (2 bits per cycle) floating-point SRT divider, shown as divide engine 310. In the illustrated embodiment, flip-flop 402 may be configured to store the divisor value (denoted RS2) and to output a 65 bit divisor D including 64 data bits and one sign bit. Inverter gate 404 outputs a one's complement version of the divisor, denoted "D_". Flip-flops 408 and 412 may be configured to store the partial remainder generated by each iteration of the divide engine.

Flip-flops 408 and 412 may be configured to store the partial remainder in a redundant sum-and-carry format. This may enable the use of carry-save adders 420, 422, 430, and 432, which may typically be faster and more compact than carry-lookahead adders. Prior to commencement of division, the dividend is stored within flip-flop 408, and the value 0 is stored into flip-flop 412. Flip-flops 408 and 412 receive inputs from respective multiplexers 406 and 410, which are dependent upon a "qsel1" select signal generated from quotient selection logic block 415.

Quotient selection logic block 415 comprises a plurality of quotient selection logic circuits (QSLC). For each cycle, the four most significant bits of the carry portion of the partial remainder stored in flip-flop 412 and the sum portion of the partial remainder stored in flip-flop 408, indicated as "C0" and "S0," are input into QSLC 414. QSLC 414 may then be configured to output a "qsel0" signal for selecting a new quotient digit from the set {−1, 0, 1} according to a quotient digit selection function, such as the function illustrated by the table given above. Additionally, qsel0 controls the selection of the second quotient digit, denoted "qsel1," via multiplexer 417. Multiplexer 417 selects this second quotient digit from one of the three instances of QSLC 416, each of which receives the four most significant sum and carry bits of CSA 420, CSA 422, or flip-flops 208 & 212, respectively.

Block 418 may be configured to calculate a partial remainder value based on the first quotient digit indicated by the qsel0 signal. Carry save adders 420 and 422 each input the contents of flip-flops 408 and 412 and one of D from flip-flop 402 or D_ from inverter 404. The outputs of carry save adders 420 and 422 are input into multiplexers 424 and 426 as shown. Multiplexers 424 and 426 receive select signal qsel0 to generate C1 and S1 values, which are carry and sum portions of a redundant-form intermediate partial remainder.

Block 428 may be configured to calculate a partial remainder value based on the second quotient digit indicated by the qsel1 signal and the partial remainder value produced by block 418. As shown, block 428 includes carry save adders 430 and 432 as well as multiplexers 434 and 438. The multiplexers 434 and 438 may be configured to receive select signal qsel1, indicative of the second quotient digit generated for the iteration, and to generate C2 and S2 values indicative of the final partial remainder for the current iteration. C2 and S2 are shifted left by one bit position (i.e., multiplied by 2) and stored back into flip-flops 408 and 412 for use during the next iteration.

As described above, two quotient digits per iteration may be produced by the illustrated embodiment of divide engine 310. Because the quotient digits are produced in a signed-digit encoding, they may need to be converted back to a two's complement form before the quotient is output from FGU 255. Any suitable one of a number of known techniques may be employed to convert the quotient into a suitable representation.

In addition to converting the quotient to its final representation, other operations may be performed on the quotient. For example, the quotient may need to be normalized and/or rounded according to an appropriate rounding scheme (such as, e.g., the various rounding schemes provided for IEEE 754 arithmetic). If the quotient is being determined within a saturating number system, the quotient may need to be saturated to a minimum or maximum value. Additionally, in some embodiments, the number of digits in the quotient may not be evenly divisible by the number of quotient digits produced per cycle. For example, in cases where the number of digits in the quotient is odd, the two-digit-per-cycle divide engine 310 will produce one more quotient digit than is required. Post-processing of the quotient may be needed to remove the spurious digit.

Figure 4B:
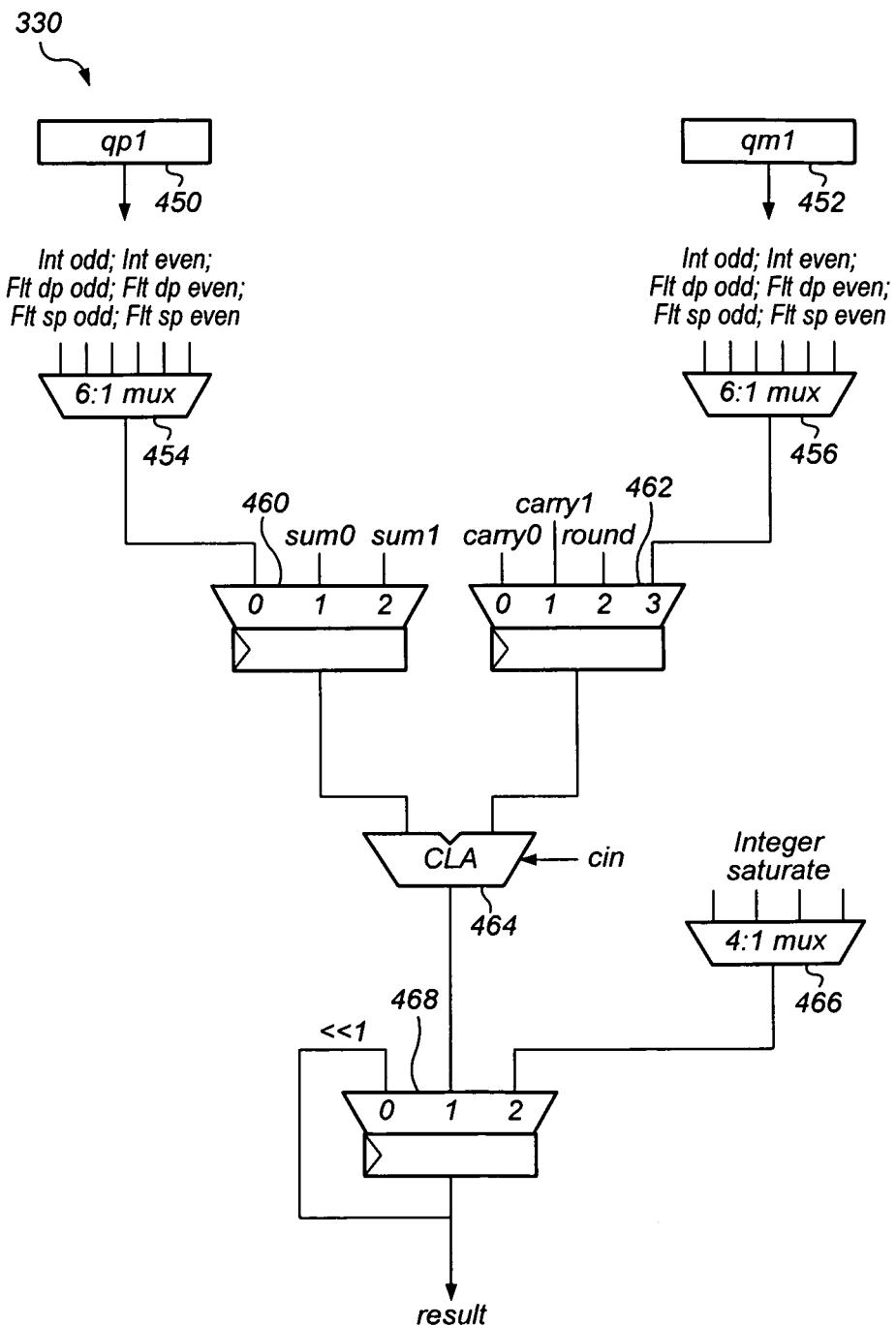
FIG. 4B is a block diagram illustrating one embodiment of circuitry configured to implement a floating point divide post-engine.

In various embodiments, divide post-engine 330 may be configured to perform various ones of the post-processing operations just mentioned. One such embodiment of divide post-engine 330 is illustrated in FIG. 4B. In the illustrated embodiment, quotient digits are logged within registers qp1 450 and qm1 452 as they are produced by divide engine 310. Specifically, qp1 register 450 may be configured to log occurrences of +1 digits, while qm1 register 452 may be configured to log −1 digits. In the illustrated embodiment, occurrences of 0 digits may not be logged.

Once iteration is complete, the contents of qp1 register 450 and qm1 register 452 may be added within a full adder, such as carry lookahead adder 464, to produce the final quotient in a 2's complement format. As noted above, it may be necessary to remove spurious digits from the quotient, which may occur either before or after the addition of qp1 and qm1. In the illustrated embodiment, format multiplexers 456-462 may be configured to account for the various possible configurations of the quotient digits, which may vary depending on whether an even or odd number of quotient digits is required, and whether the result is to be formatted as an integer, a single-precision number, or a double-precision number (each of which may specify different numbers of quotient digits).

Generally speaking, if the quotient produced by divide engine 310 is not a denormal number, the maximum normalization shift that may be required to normalize the quotient is a shift by one bit position. Output multiplexer 468 may be configured to selectively implement this shift operation, which may be needed in the event that the normalized dividend is strictly less than the normalized divisor. Output multiplexer 468 may also be configured to select a saturated result in the event that such a result is appropriate.

Denormal Operand Support for Floating Point Division

As noted above, to ensure correct operation, certain types of division algorithms may rely on the assumption that the input operands are normalized. Typically, floating-point operands are normalized by default. For example, the IEEE-754 (1985) floating-point arithmetic standard assumes that any representation of a floating-point value encoded with an exponent that is neither all zeros nor all ones denotes a normalized value. However, during operation, FGU 255 may also encounter denormal values, represented in IEEE-754 (1985) format as a nonzero fraction (mantissa) with a zero exponent.

Generally speaking, a denormal value represents a value that is smaller than is capable of being represented as a normalized number, given the smallest exponent that can be encoded. Because the number of bits available to represent the fraction is typically fixed, as denormal numbers approach zero and a greater number of fraction bits are used to represent leading zeros, fewer fraction bits may be available to represent the denormal value. Thus, denormal values may lose precision as they become smaller.

(The IEEE-754 (2008) standard preserves the encoding format of the 1985 standard with respect to denormal values, but renames denormal values as "subnormal" values. Where the term "denormal" is used herein, it is intended that this usage also encompass the term "subnormal" as it is employed in the newer standard. It is noted that in various embodiments, FGU 255 may comply with either the 1985 or 2008 versions of IEEE-754, or may implement any other suitable floating-point encoding that distinguishes normalized values from denormal values. The following discussion may be equally applicable to any such embodiment.)

In many typical hardware floating-point implementations, denormal operands are not supported for various operations, such as divide. In such implementations, when a denormal operand is detected for a divide operation, an exception or trap occurs, and a software routine handles the operation. However, implementing denormal support in software may require a substantially greater number of execution cycles to complete than a hardware implementation. On the other hand, because denormal operands are relatively infrequent, a hardware divider that supports denormal operands should attempt to minimize the impact that denormal support has on the processing of normalized operands to the extent possible.

In one embodiment, divide pre-engine 320 may be configured to detect and pre-normalize denormal divide operands before divide engine 310 begins determining the quotient. Additionally, divide pre-engine 320 may be configured to determine when a denormal result is expected to be produced from a division operation, which may occur regardless of whether the operands are normalized or denormal. Divide pre-engine 320 may also be configured to determine the number of digits in the quotient (NDQ) expected for a denormal result.

In the event of a denormal result, the number of digits in the quotient (NDQ) may be less than the full number of digits of precision provided for the intermediate quotient. In one embodiment, for IEEE 754 division, the full number of digits may be 26 bits for single precision and 55 bits for double precision, each including extra bits of precision maintained prior to final result rounding. (In other embodiments, it is contemplated that additional bits of precision may be employed to ensure the desired accuracy when the quotient is rounded to produce a final result.) When a denormal result is expected, it may be unnecessary for divide engine 310 to produce the full number of quotient digits possible for a normalized result. If the actual NDQ of the denormal result is known, divide engine 320 may be stopped after this number of digits has been generated, which may reduce the execution latency required to produce the denormal quotient.

In one embodiment, NDQ may be determined as a function of the exponents of the dividend and divisor, taking into account the number of leading zeros of either operand if it is denormal. In the following discussion, exponents are assumed to be formatted according to IEEE 754. In this format, a single-precision (SP) exponent is allowed to be in the range of −126 to +127, and is encoded as a biased 8-bit number ranging from 1 to 254 (with a bias value of 127). A double-precision (DP) exponent is allowed to be in the range of −1022 to +1023, and is encoded as a biased 11-bit number ranging from 1 to 2046 (with a bias value of 1023). However, it is contemplated the following techniques may be applied to any suitable exponent encoding, such as a sign/magnitude or 2's complement encoding, with appropriate arithmetic to account for the presence or absence of a bias.

Generally speaking, NDQ for a denormal result may be given as the number of digits in a full-precision divide result, less the number of digits of precision lost because of the denormal result. In one embodiment, the number of digits of precision lost may be given as the difference between the minimum valid exponent and the intermediate exponent, where the intermediate exponent is determined as the difference between the exponent of the normalized dividend and the exponent of the normalized divisor. Formally, this may be given as:

$$E_{int,norm} = E_{a,norm} - E_{b,norm}$$

where $E_{a,norm}$ and $E_{b,norm}$ denote the exponents of the normalized dividend and divisor respectively, and $E_{int,norm}$ denotes the intermediate exponent assuming normalized operands. Then, $$NDQ = \min(NDQ_{full}, NDQ_{full} - (E_{min} - E_{int,norm}))$$

where $NDQ_{full}$ denotes the number of quotient digits in a full-precision divide result (in one embodiment, 26 for SP and 55 for DP), and $E_{min}$ denotes the minimum valid exponent (in IEEE 754: −126 for SP and −1022 for DP). It is noted that in some embodiments, $E_{int,norm}$ may be maintained in a biased representation rather than a signed absolute representation. In such embodiments, a bias term may be added to the difference equation given above for $E_{int,norm}$. However, in such embodiments, $E_{min}$ would also be represented in biased format, such that the bias term would be canceled when generating NDQ according to the equation given above.

As an example, suppose a double-precision divide operation had a dividend a with a normalized IEEE 754 exponent of −1022+bias, and a divisor b with a normalized exponent of +10+bias. The intermediate exponent in biased form would then be −1032+bias. Given that the minimum DP exponent is −1022, the NDQ for this divide operation would be reduced by 10 digits, relative to a full-precision result (e.g., 45 digits in an embodiment where $NDQ_{full}$=55 for DP).

The above discussion assumed that the divide operands were already normalized before the exponent arithmetic was performed. For denormal operands, the exponent arithmetic may be modified to account for the normalization shift that is applied to the operands prior to division. By definition, the mantissas of denormal numbers have leading zeros prior to their first nonzero digit. To normalize a denormal mantissa, the mantissa is shifted left by the number of leading zeros, which has the effect of multiplying the mantissa by 2 for each bit position shifted. To maintain the same arithmetic value, the exponent of the normalized mantissa may be decremented by 1 for each bit position the mantissa is shifted during normalization. (In a base-2 mantissa-exponent representation, decreasing the exponent by 1 has the effect of dividing the mantissa by 2, thus canceling the effect of multiplying the mantissa by 2.) Thus, the number of leading zeros in a denormal operand may indicate the amount by which the exponent should be decreased to reflect the normalization shift to be applied to the denormal operand.

In one embodiment, the intermediate exponent may be determined from the exponents of possibly-denormal operands as follows:

$$E_{int,norm} = (E_a - Z_a) - (E_b - Z_b) = (E_a - E_b) - Z_a + Z_b$$

where $E_a$ and $E_b$ respectively denote the exponents of the dividend and divisor, prior to any normalization shift, and $Z_a$ and $Z_b$ respectively denote the number of leading zeros of the dividend and divisor, if any. As this formulation indicates, leading zeros in the dividend have the effect of reducing the normalized exponent of the dividend, and thus reducing the intermediate exponent. By contrast, leading zeros in the divisor reduce the normalized exponent of the divisor, and thus increase the intermediate exponent. (It is noted that if the dividend and divisor are both already in normalized format, both $Z_a$ and $Z_b$ will be equal to zero, and this version of $E_{int,norm}$ reduces to the one previously given.)

Figure 5:
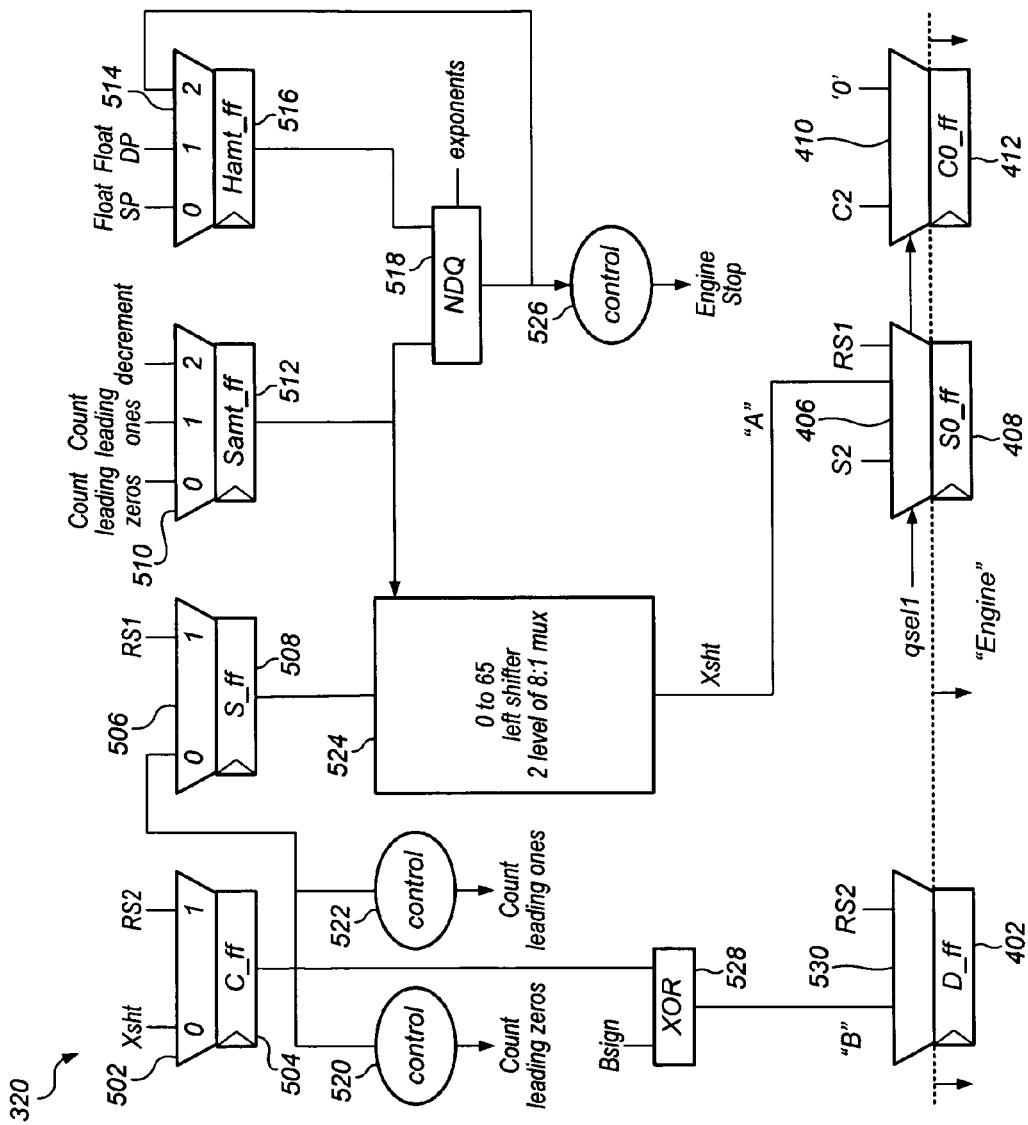
FIG. 5 is a block diagram illustrating one embodiment of circuitry configured to implement a floating point divide pre-engine that is configured to support denormal operands.

FIG. 5 shows one embodiment of divide pre-engine 320 that is configured to process denormal floating-point operands prior to operation of divide engine 310 on those operands. In the illustrated embodiment, this circuit may be configured to determine whether either of the floating-point dividend or divisor is a denormal number, to normalize any denormal operands, to calculate NDQ given the operands, and to stop divide engine 310 after the number of cycles of operation determined by the calculated NDQ. Divide pre-engine 320 may also be referred to generically as an operand normalization circuit, though as just mentioned, it may be configured to implement functionality other than operand normalization.

It is noted that in some embodiments, divide engine 310 may be configured to perform division of integer operands in addition to division of floating-point operands. Integer operands bear some similarities to floating-point denormal operands, in that integer operands are not necessarily normalized, and thus may require normalization prior to division. In the illustrated embodiment, divide pre-engine 320 may also be configured to process integer operands prior to division, including normalizing integer operands as necessary, calculating NDQ for the integer division, and stopping divide engine 310 based on the calculated NDQ. However, it is noted that support for integer division within divide engine 310, divide pre-engine 320, and divide post-engine 330 is purely optional. In some embodiments, divide support for floating-point denormal operands may be implemented with no support whatsoever for integer division. Further, it is noted that the embodiment shown in FIG. 5 is purely exemplary, and that other embodiments that implement denormal and/or integer support in different fashions are possible and contemplated. For example, in other embodiments, the circuitry may be partitioned differently with respect to state elements (e.g., registers/flip-flops) than shown in FIG. 5.

In the embodiment of FIG. 5, the initial divisor is input via RS2 input of multiplexer 502 into flip-flop 504, and the initial dividend is input via RS1 input of multiplexer 506 into flip-flop 508. Generally speaking, flip-flop 504 may be configured to store a value whose leading zero or sign bits are to be counted, flip-flop 508 may be configured to store a value that is to be normalized via a left shift, and flip-flop 512 may be configured to store a number of positions by which the normalization shift is to occur. In a first cycle, control units 520, 522 calculate the leading zeros LZ (for a positive divisor) and leading ones L1 (for a negative divisor) to determine the leading sign bits of the divisor. The values LZ and L1 arrive at inputs (0, 1) of multiplexer 510 and the select value is based on the initial (sign) bit of the divisor. It is noted that when divide pre-engine 320 processes floating-point operands that are represented in sign-magnitude format, such as IEEE 754-compliant operands, the operand may always be considered positive, and leading ones may be disregarded. (In embodiments where integer divide support is omitted, leading-ones logic 522 may also be omitted.)

Once the number of leading zeros (or leading sign bits, in the case of integers) has been determined for the divisor, this values is then stored in flip-flop 512 as the shift amount "Samt". The divisor value, previously stored within flip-flop 504, is input into the first input (0) of multiplexer 506 for input into flip-flop 508, where it takes the place of the dividend previously stored in flip-flop 508. Meanwhile, the dividend passes through left shifter 524 (without any shifting) and arrives at the Xsht input of multiplexer 502, to take the place of the divisor in flip-flop 504. This is indicated in FIG. 5 by the label "Xsht" at both the output of left shifter 524 and the input to multiplexer 502, which passes the shifted value to flip-flop 504. Thus, after the number of leading zeros is determined for the divisor, in the illustrated embodiment, the divisor and dividend exchange places within flip-flops 504 and 508.

In the second cycle, the number of leading zero bits (or leading sign bits, in the case of integers) of the dividend, now stored in flip-flop 504, are counted and presented to multiplexer 510 for storage in flip-flop 512. The dividend re-enters flip-flop 508 via the first input (0) of multiplexer 506. Meanwhile, the divisor, which was previously stored in flip-flop 508, passes through left shifter 524 and is left shifted by the number of leading zero or sign bits of the divisor, which was determined and stored into flip-flop 512 during the previous cycle. After the normalization shift, the normalized divisor is output from left shifter 524 and reenters flip-flop 504 via the Xsht input of multiplexer 502.

In the third cycle, the divisor, now normalized and located in flip-flop 504, passes through XOR 528 and enters flip-flop 402 via input "B" for input into divide engine 310. In the case of integer division, XOR 528 converts the divisor into a one's complement form when the divisor is negative, as indicated by Bsign. If the divisor is positive, then no change is made. For floating-point operands represented in sign/magnitude format, Bsign may be forced to zero and the divisor may pass through XOR 528 unmodified. Meanwhile, the dividend passes from flip-flop 508 through left shifter 524 to be normalized in the same manner that the divisor was normalized during the previous cycle. After normalization, the dividend is input via input "A" of multiplexer 406 into flip-flop 408, ready for division.

In the illustrated embodiment, divide pre-engine 320 includes NDQ logic 518, which may be configured to calculate the value NDQ. In one embodiment, the number of leading zero or sign bits of the divisor that was determined in the first cycle is input into flip-flop 512 via multiplexer 510, and then passed through NDQ logic 518 unmodified and stored into flip-flop 516. In the next clock cycle, the number of leading zero or sign bits of the dividend is determined and stored in flip-flop 512 via multiplexer 510. Once the numbers of leading zero or sign bits for the dividend and divisor (e.g., $Z_a$ and $Z_b$) are known, NDQ logic 518 may be configured to combine these terms with the exponents of the dividend and divisor (e.g., $E_a$ and $E_b$), as well as information about the minimum exponent and the full number of quotient digits expected for the type of divide operation to be performed (e.g., $E_{min}$ and $NDQ_{full}$ for an SP or DP divide) in order to determine NDQ for the current divide operation. For example, NDQ logic 518 may include one or more adders configured to perform the exponent arithmetic described above, or any suitable variant of that arithmetic.

Once NDQ for the current divide operation has been generated, control logic 526 may be configured to utilize NDQ to determine when divide engine 310 should be stopped. In one embodiment, control logic 526 may be configured as a counter that is initially set to the value of NDQ generated by NDQ logic 518. For each iteration performed by divide engine 310, the counter may be decremented by the number of quotient digits generated during that iteration (e.g., 2 quotient digits for a radix-4 implementation). When the counter equals zero (or falls below zero, in the event that NDQ is not an even multiple of the number of digits generated), the control logic 526 may signal that divide engine 310 should stop iterating. Numerous other embodiments of control logic 526 are possible and contemplated. For example, instead of being decremented from NDQ towards zero, a counter may be configured to increment from zero towards NDQ and to terminate when the counter equals or exceeds NDQ.

Other embodiments of divide pre-engine 320 are possible and contemplated. For example, instead of providing one normalizing shifter and normalizing each operand over two successive cycles, two normalizing shifters may be employed to concurrently normalize both operands.

Figure 6:
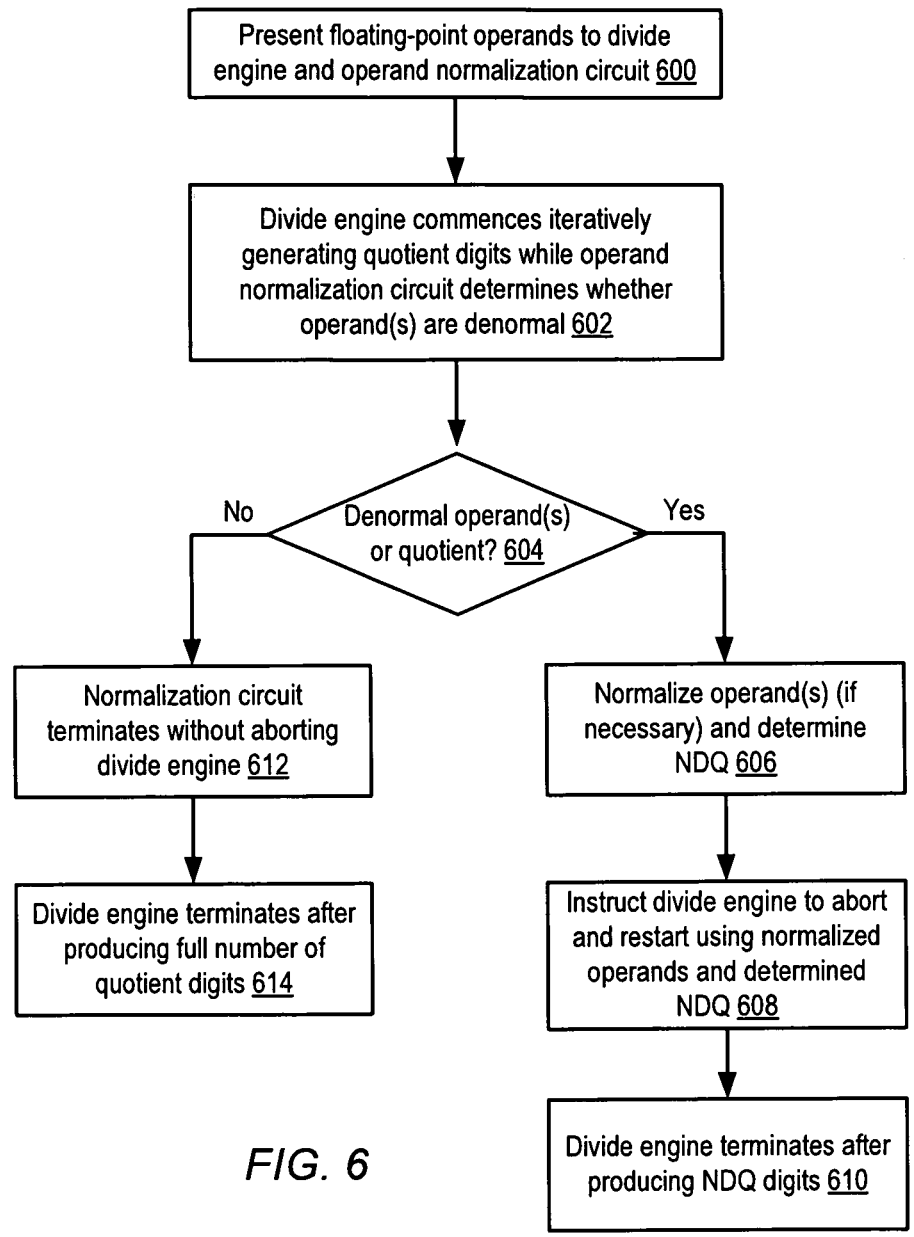
FIG. 6 is a flow diagram illustrating the operation of one embodiment of a floating-point divider configured to support denormal operands.

FIG. 6 illustrates one embodiment of a method of operation of FGU 255 to perform floating-point division on operands that are possibly denormal. Referring collectively to FIGS. 3-6, operation begins in block 600 where floating-point operands for a floating-point divide operation are presented to both a divide engine and to an operand normalization circuit. For example, as shown in FIG. 3, the divide operands are concurrently presented both to divide engine 310 and to divide pre-engine 320.

In response to receiving the divide operands, divide engine 310 may commence iteratively generating quotient digits while divide pre-engine 320 determines whether either of the operands is a denormal number (block 602). That is, divide engine 310 may begin the division process before it is known whether there are denormal operands.

In response to determining that one or more of the operands is denormal or that the quotient is expected to be denormal (block 604), divide pre-engine 320 may normalize the denormal operand(s) (if necessary; in some instances a denormal quotient may result from already-normalized operands) and determine NDQ for the quotient (block 606). Divide pre-engine 320 may further instruct divide engine 310 to abort the previously-commenced generation of quotient digits and to restart generating quotient digits using the NDQ and normalized operands provided by divide pre-engine 320 (block 608). In this instance, divide engine 310 may terminate after producing NDQ quotient digits, as determined by divide pre-engine 320 (block 610).

In response to determining that none of the operands is denormal, divide pre-engine 320 may terminate processing of the floating-point divide operation without instructing divide engine 310 to abort the previously-commenced iterative generation of quotient digits (block 612). In this instance, divide engine 310 may terminate after producing the full number of quotient digits expected for the floating-point divide operation (block 614).

It is noted that in the embodiment shown in FIG. 6, divide engine 310 may begin the process of division under the assumption that the operands it has received are already normalized. Because denormal operands and/or results are relatively uncommon, this assumption is likely to be true in most cases. Thus, by speculating that the normalized case is the common case, the existence of hardware denormal support may not incur a performance penalty for the normalized case. In the event that the speculation is wrong, and one or more operands or the quotient is denormal, some work already performed by divide engine 310 may be discarded. However, in many instances, the divide engine 310 will perform fewer iterations once it is restarted.

Exemplary System Embodiment

Figure 7:
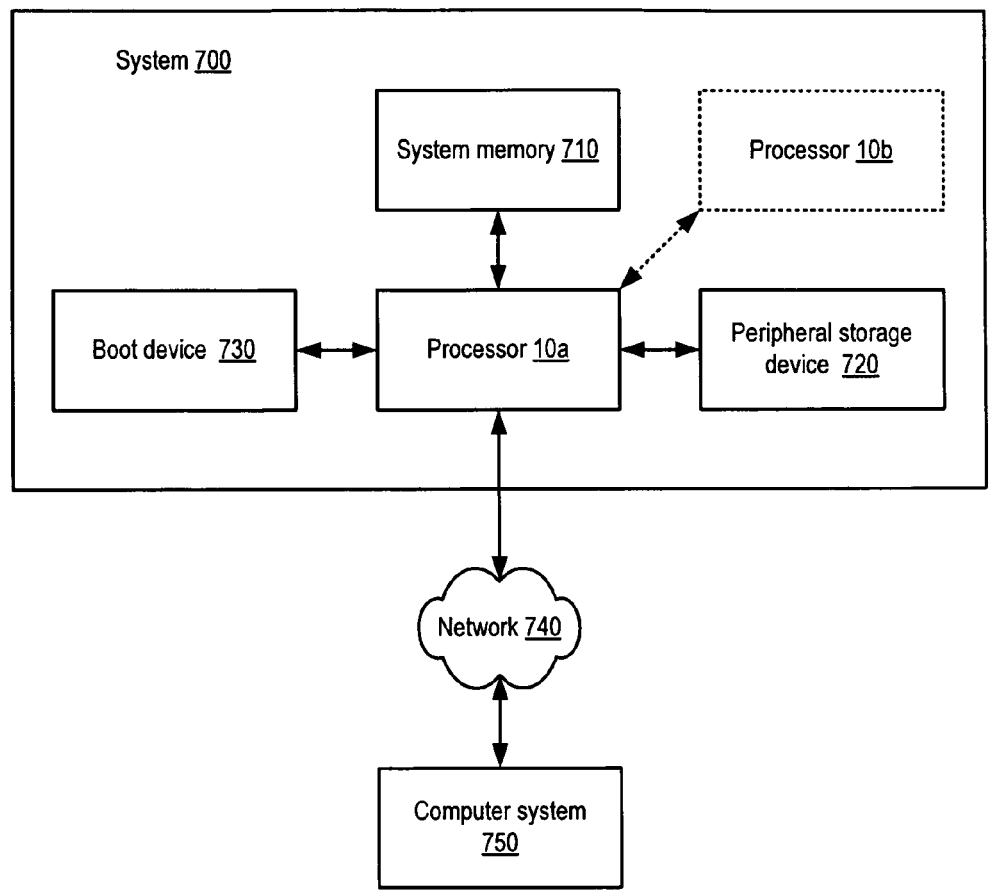
FIG. 7 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 7. In the illustrated embodiment, system 700 includes an instance of processor 10, shown as processor 10*a*, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10*a* may optionally be coupled to one or more other instances of processor 10, shown in FIG. 7 as processor 10b. For example, processors 10a-b may be coupled to communicate via their respective coherent processor interfaces 140.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 720 may be coupled to processor 10 via peripheral interface(s) 150 of FIG. 1.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A floating-point circuit, comprising:
a floating-point operand normalization circuit configured to receive input floating-point operands of a given floating-point divide operation, the operands comprising a dividend and a divisor; and
a divide engine coupled to the floating-point operand normalization circuit;
wherein in response to determining that one or more of the input floating-point operands is a denormal number, the floating-point operand normalization circuit is further configured to:
normalize the one or more of the input floating-point operands and output a normalized dividend and normalized divisor to the divide engine;
dependent upon respective numbers of leading zeros of the dividend and divisor prior to normalization, generate a value indicative of a maximum possible number of digits of a quotient (NDQ);
wherein the divide engine is configured to iteratively generate NDQ digits of a floating-point quotient from the normalized dividend and the normalized divisor provided by the floating-point operand normalization circuit.

2. The floating-point circuit as recited in claim 1, further comprising control logic configured to stop the divide engine after NDQ digits of the floating-point quotient have been generated.

3. The floating-point circuit as recited in claim 1, wherein the divide engine is further configured to receive the input floating-point operands and to commence iteratively generating quotient digits prior to the floating-point operand normalization circuit determining that one or more of the input floating-point operands is a denormal number.

4. The floating-point circuit as recited in claim 3, wherein in response to determining that one or more of the input floating-point operands is a denormal number, the floating-point operand normalization circuit is further configured to instruct the divide engine to abort the previously-commenced generation of quotient digits and to restart iteratively generating quotient digits using the normalized dividend and normalized divisor.

5. The floating-point circuit as recited in claim 3, wherein in response to determining that none of the input floating-point operands is a denormal number, the floating-point operand normalization circuit is further configured to terminate processing the given floating-point operation without instructing the divide engine to abort the previously-commenced generation of quotient digits.

6. The floating-point circuit as recited in claim 1, wherein the floating-point operand normalization circuit is further configured to generate NDQ dependent upon whether the quotient to be generated by the divide engine will be a denormal number, as determined from exponents of the input floating-point operands.

7. The floating-point circuit as recited in claim 1, further comprising a divide post-engine circuit configured to remove spurious quotient digits produced in instances where NDQ is not an even multiple of a number of quotient digits produced by the divide engine during each iteration.

8. The floating-point circuit as recited in claim 7, wherein the divide post-engine circuit is further configured to perform rounding and normalization of the quotient produced by the divide engine.

9. The floating-point circuit as recited in claim 1, wherein the floating-point operand normalization circuit is further configured to receive integer operands for an integer divide operation, the integer operands comprising an integer dividend and an integer divisor, and in response to receiving the integer operands, the floating-point operand normalization circuit is further configured to:
normalize the integer operands and output the normalized integer dividend and normalized integer divisor to the divide engine;
dependent upon respective numbers of leading sign bits of the integer dividend and integer divisor prior to normalization, generate a value indicative of a maximum possible number of digits of a quotient (NDQ) for the integer divide operation.

10. A processor, comprising:
the floating-point circuit as recited in claim 1; and
instruction fetch logic configured to issue the given floating-point divide operation to the floating-point circuit for execution.

11. A system, comprising:
the processor as recited in claim 10; and
a system memory coupled to the processor.

12. A method, comprising:
a floating-point operand normalization circuit receiving input floating-point operands of a given floating-point divide operation, the operands comprising a dividend and a divisor; and
in response to determining that one or more of the input floating-point operands is a denormal number:
the floating-point operand normalization circuit normalizing the one or more of the input floating-point operands and outputting a normalized dividend and normalized divisor to a divide engine circuit;
dependent upon respective numbers of leading zeros of the dividend and divisor prior to normalization, the floating-point operand normalization circuit generating a value indicative of a maximum possible number of digits of a quotient (NDQ);
the divide engine circuit iteratively generating NDQ digits of a floating-point quotient from the normalized dividend and the normalized divisor provided by the floating-point operand normalization circuit.

13. The method as recited in claim 12, further comprising stopping the divide engine circuit after NDQ digits of the floating-point quotient have been generated.

14. The method as recited in claim 12, further comprising the divide engine circuit receiving the input floating-point operands and commencing iteratively generating quotient digits prior to the floating-point operand normalization circuit determining that one or more of the input floating-point operands is a denormal number.

15. The method as recited in claim 14, further comprising:
in response to the floating-point operand normalization circuit determining that one or more of the input floating-point operands is a denormal number, the divide engine circuit aborting the previously-commenced generation of quotient digits and restarting iteratively generating quotient digits using the normalized dividend and normalized divisor.

16. The method as recited in claim 14, further comprising:
in response to determining that none of the input floating-point operands is a denormal number, the operand normalization circuit terminating processing of the given floating-point operation without the divide engine aborting the previously-commenced generation of quotient digits.

17. The method as recited in claim 12, wherein the floating-point operand normalization circuit generating NDQ is further dependent upon whether the quotient to be generated by the divide engine will be a denormal number, as determined from exponents of the input floating-point operands.

18. The method as recited in claim 12, further comprising removing spurious quotient digits produced in instances where NDQ is not an even multiple of a number of quotient digits produced by the divide engine during each iteration.

19. The method as recited in claim 12, further comprising performing rounding and normalization of the quotient produced by the divide engine.

20. The method as recited in claim 12, further comprising:
the floating-point operand normalization circuit receiving integer operands for an integer divide operation, the integer operands comprising an integer dividend and an integer divisor;
in response to receiving the integer operands, the floating-point operand normalization circuit:
normalizing the integer operands and outputting the normalized integer dividend and normalized integer divisor to the divide engine;
dependent upon respective numbers of leading sign bits of the integer dividend and integer divisor prior to normalization, generating a value indicative of a maximum possible number of digits of a quotient (NDQ) for the integer divide operation.

\* \* \* \* \*